United States Patent
Thompson et al.

(10) Patent No.: US 11,017,479 B2
(45) Date of Patent: *May 25, 2021

(54) SYSTEM AND METHOD FOR ADVERSE VEHICLE EVENT DETERMINATION

(71) Applicant: Nauto, Inc., Palo Alto, CA (US)

(72) Inventors: Alex Thompson, Palo Alto, CA (US); Shobana Sankaran, Palo Alto, CA (US); Charles Hornbaker, Palo Alto, CA (US); Stefan Heck, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/171,219

(22) Filed: Oct. 25, 2018

(65) Prior Publication Data

US 2019/0066225 A1    Feb. 28, 2019

Related U.S. Application Data

(62) Division of application No. 16/011,013, filed on Jun. 18, 2018, now Pat. No. 10,453,150.

(Continued)

(51) Int. Cl.
*G06Q 40/00* (2012.01)
*G06Q 40/08* (2012.01)
(Continued)

(52) U.S. Cl.
CPC ............. *G06Q 40/08* (2013.01); *G06N 7/005* (2013.01); *G06Q 10/10* (2013.01); *G06Q 50/30* (2013.01)

(58) Field of Classification Search
CPC .... G07C 5/0891; G08G 1/205; G08G 1/0129; H04L 65/4069; B62D 41/00;
(Continued)

(56) References Cited

U.S. PATENT DOCUMENTS 5,584,035 A    12/1996  Duggan et al.
5,638,116 A     6/1997  Shimoura et al.
(Continued)

FOREIGN PATENT DOCUMENTS

DE    102009005730 A1    7/2010
EP         3057061 B1    8/2017
(Continued)

OTHER PUBLICATIONS

"Which P&C Insurers Have Filed Patents Related to Autonomous Vehicles", Dec. 14, 2016, https://www.cbinsights.com/research/autonomous-vehicle-insurance-patents/?ReillyBrennanFoT, downloaded from the internet on Sep. 4, 2018.

(Continued)

*Primary Examiner* — Mike Anderson
(74) *Attorney, Agent, or Firm* — Vista IP Law Group, LLP

(57) ABSTRACT

A method for determining an adverse vehicle event, including: sampling sensor data an onboard vehicle system coupled to an ego-vehicle; at the onboard vehicle system, extracting a set of event parameters from the sensor data, wherein the vehicle event data is associated with a vehicle event occurring within the time interval; computing a loss probability based on the set of event parameters in response to the loss probability exceeding a threshold probability, transforming the set of event parameters into insurance claim data; and automatically transmitting the insurance claim data to an endpoint, wherein the endpoint is determined based on the participant identifier.

19 Claims, 4 Drawing Sheets

Related U.S. Application Data

(60) Provisional application No. 62/521,058, filed on Jun. 16, 2017.

(51) Int. Cl.
  *G06Q 10/10* (2012.01)
  *G06Q 50/30* (2012.01)
  *G06N 7/00* (2006.01)

(58) Field of Classification Search
  CPC ......... H04M 1/72538; H04M 2250/12; B60W 30/08; B60W 40/10; G06K 9/00664; G06K 9/00791; G06K 9/00798; G06Q 40/08
  See application file for complete search history.

(56) References Cited

U.S. PATENT DOCUMENTS

| | | |
|---|---|---|
| 5,642,106 A | 6/1997 | Hancock et al. |
| 5,798,949 A | 8/1998 | Kaub |
| 5,898,390 A | 4/1999 | Oshizawa et al. |
| 5,961,571 A | 10/1999 | Gorr et al. |
| 6,018,728 A | 1/2000 | Spence et al. |
| 6,240,367 B1 | 5/2001 | Lin |
| 6,480,784 B2 | 11/2002 | Mizuno |
| 6,496,117 B2 | 12/2002 | Gutta et al. |
| 6,502,033 B1 | 12/2002 | Phuyal |
| 6,552,141 B1 | 4/2003 | Chmelir et al. |
| 6,662,141 B2 | 12/2003 | Kaub |
| 6,720,920 B2 | 4/2004 | Breed et al. |
| 6,927,694 B1 | 8/2005 | Smith et al. |
| 7,085,637 B2 | 8/2006 | Breed et al. |
| 7,148,913 B2 | 12/2006 | Keaton et al. |
| 7,177,737 B2 | 2/2007 | Karlsson et al. |
| 7,195,394 B2 | 3/2007 | Singh |
| 7,212,651 B2 | 5/2007 | Viola et al. |
| 7,421,321 B2 | 9/2008 | Breed et al. |
| 7,423,540 B2 | 9/2008 | Kisacanin |
| 7,460,940 B2 | 12/2008 | Larsson et al. |
| 7,471,929 B2 | 12/2008 | Fujioka et al. |
| 7,502,677 B2 | 3/2009 | Weichenberger et al. |
| 7,502,688 B2 | 3/2009 | Hirokawa |
| 7,551,093 B2 | 6/2009 | Maass |
| 7,558,672 B2 | 7/2009 | Egami et al. |
| 7,639,148 B2 | 12/2009 | Victor |
| 7,646,922 B2 | 1/2010 | Au et al. |
| 7,844,077 B2 | 11/2010 | Kochi et al. |
| 7,853,072 B2 | 12/2010 | Han et al. |
| 7,868,821 B2 | 1/2011 | Hoshizaki |
| 7,912,288 B2 | 3/2011 | Winn et al. |
| 7,954,587 B2 | 6/2011 | Kisanuki et al. |
| 7,974,748 B2 | 7/2011 | Goerick et al. |
| 8,022,831 B1 | 9/2011 | Wood-Eyre |
| 8,073,287 B1 | 12/2011 | Wechsler et al. |
| 8,114,568 B2 | 2/2012 | Van et al. |
| 8,144,542 B2 | 3/2012 | Na |
| 8,174,568 B2 | 5/2012 | Samarasekera et al. |
| 8,195,394 B1 | 6/2012 | Zhu et al. |
| 8,254,670 B2 | 8/2012 | Prokhorov |
| 8,266,132 B2 | 9/2012 | Ofek et al. |
| 8,301,344 B2 | 10/2012 | Simon et al. |
| 8,344,849 B2 | 1/2013 | Larsson et al. |
| 8,369,608 B2 | 2/2013 | Gunaratne |
| 8,441,519 B2 | 5/2013 | Dshima et al. |
| 8,442,791 B2 | 5/2013 | Staehlin |
| 8,447,519 B2 | 5/2013 | Basnayake et al. |
| 8,487,775 B2 | 7/2013 | Victor et al. |
| 8,498,813 B2 | 7/2013 | Oohashi et al. |
| 8,502,860 B2 | 8/2013 | Demirdjian |
| 8,510,196 B1 | 8/2013 | Brandmaier et al. |
| 8,594,920 B2 | 11/2013 | Shida |
| 8,606,492 B1 | 12/2013 | Botnen |
| 8,619,135 B2 | 12/2013 | Shellshear et al. |
| 8,654,151 B2 | 2/2014 | Kim |
| 8,666,644 B2 | 3/2014 | Goto |
| 8,676,498 B2 | 3/2014 | Ma et al. |
| 8,744,642 B2 | 6/2014 | Nemat-Nasser et al. |
| 8,761,439 B1 | 6/2014 | Kumar et al. |
| 8,799,034 B1 | 8/2014 | Brandmaier et al. |
| 8,805,707 B2 | 8/2014 | Schumann et al. |
| 8,854,199 B2 | 10/2014 | Cook et al. |
| 8,862,380 B2 | 10/2014 | Jung |
| 8,934,709 B2 | 1/2015 | Saptharishi et al. |
| 8,952,819 B2 | 2/2015 | Nemat-Nasser |
| 9,019,571 B2 | 4/2015 | Yamada |
| 9,053,554 B2 | 6/2015 | Uchida et al. |
| 9,079,571 B2 | 7/2015 | Trost et al. |
| 9,081,650 B1 | 7/2015 | Brinkmann et al. |
| 9,111,147 B2 | 8/2015 | Thornton et al. |
| 9,121,713 B2 | 9/2015 | Samarasekera et al. |
| 9,146,558 B2 | 9/2015 | Field et al. |
| 9,158,962 B1 | 10/2015 | Nemat-Nasser et al. |
| 9,180,887 B2 | 11/2015 | Nemat-Nasser et al. |
| 9,201,424 B1 | 12/2015 | Ogale |
| 9,201,932 B2 | 12/2015 | Silver et al. |
| 9,218,003 B2 | 12/2015 | Fong et al. |
| 9,235,750 B1 | 1/2016 | Sutton et al. |
| 9,305,214 B1 | 4/2016 | Young et al. |
| 9,327,743 B2 | 5/2016 | Green et al. |
| 9,330,571 B2 | 5/2016 | Ferguson et al. |
| 9,349,113 B2 | 5/2016 | Bashkin |
| 9,358,976 B2 | 6/2016 | Stierlin |
| 9,412,102 B2 | 8/2016 | Wolf et al. |
| 9,429,439 B2 | 8/2016 | Stümper |
| 9,439,036 B2 | 9/2016 | Spears et al. |
| 9,443,309 B2 | 9/2016 | Menashe et al. |
| 9,465,978 B2 | 10/2016 | Hachisuka et al. |
| 9,472,102 B2 | 10/2016 | McClain et al. |
| 9,491,374 B1 | 11/2016 | Avrahami et al. |
| 9,514,626 B2 | 12/2016 | Wu et al. |
| 9,535,878 B1 | 1/2017 | Brinkmann et al. |
| 9,573,541 B2 | 2/2017 | Graumann et al. |
| 9,679,480 B2 | 6/2017 | Hakeem |
| 9,688,150 B2 | 6/2017 | Seong et al. |
| 9,701,307 B1 | 7/2017 | Newman et al. |
| 9,718,468 B2 | 8/2017 | Barfield et al. |
| 9,731,727 B2 | 8/2017 | Heim et al. |
| 9,734,414 B2 | 8/2017 | Samarasekera et al. |
| 9,734,455 B2 | 8/2017 | Levinson et al. |
| 9,767,625 B1 | 9/2017 | Snyder et al. |
| 9,812,016 B2 | 11/2017 | Oremus |
| 9,845,097 B2 | 12/2017 | Prakah-Asante et al. |
| 9,851,214 B1 | 12/2017 | Chintakindi |
| 9,852,019 B2 | 12/2017 | Ashani |
| 9,881,218 B2 | 1/2018 | Ogata et al. |
| 9,892,558 B2 | 2/2018 | Troy et al. |
| 9,928,432 B1 | 3/2018 | Sathyanarayana et al. |
| 9,977,973 B2 | 5/2018 | Okuda et al. |
| 10,078,333 B1 | 9/2018 | Bajracharya |
| 2001/0018636 A1 | 8/2001 | Mizuno |
| 2002/0082806 A1 | 6/2002 | Kaub |
| 2002/0140562 A1 | 10/2002 | Gutta et al. |
| 2002/0180870 A1* | 12/2002 | Chen ..................... H04N 5/144 348/207.1 |
| 2002/0198632 A1 | 12/2002 | Breed et al. |
| 2003/0095140 A1 | 5/2003 | Keaton et al. |
| 2003/0169907 A1 | 9/2003 | Edwards et al. |
| 2004/0051659 A1 | 3/2004 | Garrison |
| 2004/0071319 A1* | 4/2004 | Kikuchi ................... G08G 1/04 382/107 |
| 2004/0167667 A1 | 8/2004 | Goncalves et al. |
| 2004/0168148 A1 | 8/2004 | Goncalves et al. |
| 2004/0258307 A1 | 12/2004 | Viola et al. |
| 2005/0002558 A1 | 1/2005 | Franke et al. |
| 2005/0060069 A1 | 3/2005 | Breed et al. |
| 2005/0073136 A1 | 4/2005 | Larsson et al. |
| 2005/0182518 A1 | 8/2005 | Karlsson |
| 2005/0234679 A1 | 10/2005 | Karlsson |
| 2005/0273218 A1 | 12/2005 | Breed et al. |
| 2005/0273263 A1 | 12/2005 | Egami et al. |
| 2006/0106534 A1 | 5/2006 | Kawamata et al. |
| 2006/0186702 A1 | 8/2006 | Kisanuki et al. |
| 2006/0187305 A1 | 8/2006 | Trivedi et al. |

(56) References Cited

U.S. PATENT DOCUMENTS

| | | |
|---|---|---|
| 2006/0247847 A1 | 11/2006 | Carter et al. |
| 2006/0271287 A1 | 11/2006 | Gold et al. |
| 2007/0043491 A1 | 2/2007 | Goerick et al. |
| 2007/0050108 A1 | 3/2007 | Larschan et al. |
| 2007/0063855 A1 | 3/2007 | Maass |
| 2007/0100669 A1 | 5/2007 | Wargin et al. |
| 2007/0120948 A1 | 5/2007 | Fujioka et al. |
| 2007/0154063 A1 | 7/2007 | Breed |
| 2007/0154100 A1 | 7/2007 | Au et al. |
| 2007/0159344 A1 | 7/2007 | Kisacanin |
| 2007/0244640 A1 | 10/2007 | Hirokawa |
| 2007/0263901 A1 | 11/2007 | Wu et al. |
| 2007/0280505 A1 | 12/2007 | Breed |
| 2008/0025568 A1 | 1/2008 | Han et al. |
| 2008/0049975 A1* | 2/2008 | Stiegler ............... G06T 7/20 382/104 |
| 2008/0051957 A1* | 2/2008 | Breed ............ B60R 21/01552 701/36 |
| 2008/0075367 A1 | 3/2008 | Winn et al. |
| 2008/0084283 A1 | 4/2008 | Kalik |
| 2008/0167814 A1 | 7/2008 | Samarasekera et al. |
| 2008/0243378 A1 | 10/2008 | Zavoli |
| 2008/0252412 A1 | 10/2008 | Larsson et al. |
| 2008/0260207 A1 | 10/2008 | Nagaoka et al. |
| 2009/0080697 A1 | 3/2009 | Kishikawa et al. |
| 2009/0175498 A1 | 7/2009 | Kochi et al. |
| 2009/0244291 A1 | 10/2009 | Saptharishi et al. |
| 2009/0261979 A1 | 10/2009 | Breed et al. |
| 2010/0061591 A1 | 3/2010 | Okada et al. |
| 2010/0100276 A1* | 4/2010 | Fujinawa ............... G07C 5/0891 701/32.2 |
| 2010/0169013 A1 | 7/2010 | Nakamura et al. |
| 2010/0176987 A1 | 7/2010 | Hoshizaki |
| 2010/0209881 A1 | 8/2010 | Lin et al. |
| 2010/0215254 A1 | 8/2010 | Prokhorov |
| 2010/0217524 A1 | 8/2010 | Oohashi et al. |
| 2010/0225665 A1 | 9/2010 | Ofek et al. |
| 2010/0238009 A1 | 9/2010 | Cook et al. |
| 2010/0312745 A1 | 12/2010 | Tabak |
| 2010/0322507 A1 | 12/2010 | Gunaratne |
| 2011/0128374 A1 | 6/2011 | Shellshear et al. |
| 2011/0137527 A1 | 6/2011 | Simon et al. |
| 2011/0245993 A1 | 10/2011 | Goto |
| 2011/0262004 A1 | 10/2011 | Murakami |
| 2011/0301779 A1 | 12/2011 | Shida |
| 2011/0316980 A1 | 12/2011 | Dubbelman et al. |
| 2012/0027258 A1 | 2/2012 | Uchida et al. |
| 2012/0078510 A1 | 3/2012 | Ma et al. |
| 2012/0116676 A1 | 5/2012 | Basnayake et al. |
| 2012/0121161 A1 | 5/2012 | Eade et al. |
| 2012/0122486 A1 | 5/2012 | Day et al. |
| 2012/0123806 A1 | 5/2012 | Schumann et al. |
| 2012/0154425 A1 | 6/2012 | Kim |
| 2012/0185091 A1 | 7/2012 | Field et al. |
| 2012/0197519 A1 | 8/2012 | Richardson |
| 2012/0206596 A1 | 8/2012 | Samarasekera et al. |
| 2012/0263346 A1 | 10/2012 | Datta et al. |
| 2013/0073114 A1* | 3/2013 | Nemat-Nasser ...... B60W 40/09 701/1 |
| 2013/0093886 A1 | 4/2013 | Rothschild |
| 2013/0142390 A1 | 6/2013 | Othmezouri et al. |
| 2013/0147661 A1 | 6/2013 | Kangas et al. |
| 2013/0155229 A1 | 6/2013 | Thornton et al. |
| 2013/0194127 A1 | 8/2013 | Ishihara et al. |
| 2013/0211687 A1 | 8/2013 | Trost et al. |
| 2014/0037138 A1 | 2/2014 | Sato et al. |
| 2014/0049601 A1 | 2/2014 | Pfeil |
| 2014/0139655 A1 | 5/2014 | Mimar |
| 2014/0195477 A1 | 7/2014 | Graumann et al. |
| 2014/0210625 A1 | 7/2014 | Nemat-Nasser |
| 2014/0210978 A1 | 7/2014 | Gunaratne et al. |
| 2014/0213300 A1 | 7/2014 | Spears et al. |
| 2014/0214255 A1 | 7/2014 | Dolgov et al. |
| 2014/0222280 A1 | 8/2014 | Salomonsson et al. |
| 2014/0267703 A1 | 9/2014 | Taylor et al. |
| 2014/0297170 A1 | 10/2014 | Sakima et al. |
| 2014/0300739 A1 | 10/2014 | Mimar |
| 2014/0324281 A1 | 10/2014 | Nemat-Nasser et al. |
| 2014/0379233 A1 | 12/2014 | Chundrlik et al. |
| 2015/0025917 A1 | 1/2015 | Stempora |
| 2015/0049195 A1 | 2/2015 | Ishigaki et al. |
| 2015/0078632 A1 | 3/2015 | Hachisuka et al. |
| 2015/0084757 A1 | 3/2015 | Annibale et al. |
| 2015/0086078 A1 | 3/2015 | Sibiryakov |
| 2015/0110344 A1 | 4/2015 | Okumura |
| 2015/0140991 A1 | 5/2015 | Silver et al. |
| 2015/0154845 A1 | 6/2015 | Wu et al. |
| 2015/0161892 A1 | 6/2015 | Oremus |
| 2015/0213556 A1* | 7/2015 | Haller, Jr. ............ G06Q 40/08 705/4 |
| 2015/0219462 A1 | 8/2015 | Stmper |
| 2015/0221136 A1 | 8/2015 | Shaburova et al. |
| 2015/0228077 A1 | 8/2015 | Menashe et al. |
| 2015/0239482 A1 | 8/2015 | Green et al. |
| 2015/0254603 A1 | 9/2015 | Bashkin |
| 2015/0269438 A1 | 9/2015 | Samarasekera et al. |
| 2015/0274161 A1 | 10/2015 | Stierlin |
| 2015/0284001 A1 | 10/2015 | Watanabe et al. |
| 2015/0294422 A1 | 10/2015 | Carver et al. |
| 2015/0344030 A1 | 12/2015 | Damerow et al. |
| 2015/0375756 A1 | 12/2015 | Do et al. |
| 2015/0379715 A1 | 12/2015 | Chandrasekar et al. |
| 2016/0063341 A1 | 3/2016 | Ogata et al. |
| 2016/0063761 A1 | 3/2016 | Sisbot et al. |
| 2016/0078303 A1 | 3/2016 | Samarasekera et al. |
| 2016/0086021 A1 | 3/2016 | Grohman et al. |
| 2016/0139977 A1 | 5/2016 | Ashani |
| 2016/0147230 A1 | 5/2016 | Munich et al. |
| 2016/0163198 A1 | 6/2016 | Dougherty |
| 2016/0169690 A1 | 6/2016 | Bogovich et al. |
| 2016/0176397 A1 | 6/2016 | Prokhorov et al. |
| 2016/0203373 A1 | 7/2016 | Menashe et al. |
| 2016/0209511 A1 | 7/2016 | Dolinar et al. |
| 2016/0244022 A1 | 8/2016 | Lippman et al. |
| 2016/0253806 A1 | 9/2016 | Iimura |
| 2016/0253886 A1 | 9/2016 | Buchholz et al. |
| 2016/0267335 A1 | 9/2016 | Hampiholi |
| 2016/0284078 A1 | 9/2016 | Kim et al. |
| 2016/0297365 A1 | 10/2016 | Nix |
| 2016/0297449 A1 | 10/2016 | Heim et al. |
| 2016/0300242 A1 | 10/2016 | Truong et al. |
| 2016/0305794 A1 | 10/2016 | Horita et al. |
| 2016/0335475 A1 | 11/2016 | Krenzer et al. |
| 2016/0339782 A1 | 11/2016 | Seong et al. |
| 2017/0011529 A1 | 1/2017 | Urashita |
| 2017/0039848 A1 | 2/2017 | Hakeem |
| 2017/0039850 A1 | 2/2017 | Vanden Berg et al. |
| 2017/0043781 A1 | 2/2017 | Prakah-Asante et al. |
| 2017/0048239 A1 | 2/2017 | Jeon et al. |
| 2017/0053167 A1 | 2/2017 | Ren et al. |
| 2017/0053461 A1* | 2/2017 | Pal ..................... G07C 5/008 |
| 2017/0053555 A1 | 2/2017 | Angel et al. |
| 2017/0055868 A1 | 3/2017 | Hatakeyama |
| 2017/0061222 A1 | 3/2017 | Hoye et al. |
| 2017/0064363 A1 | 3/2017 | Wexler et al. |
| 2017/0080900 A1 | 3/2017 | Huennekens et al. |
| 2017/0088142 A1 | 3/2017 | Hunt et al. |
| 2017/0089710 A1 | 3/2017 | Slusar |
| 2017/0098131 A1 | 4/2017 | Shashua et al. |
| 2017/0101093 A1 | 4/2017 | Barfield, Jr. et al. |
| 2017/0106869 A1 | 4/2017 | Lavoie et al. |
| 2017/0109828 A1 | 4/2017 | Pierce et al. |
| 2017/0113664 A1 | 4/2017 | Nix |
| 2017/0124476 A1 | 5/2017 | Levinson et al. |
| 2017/0140231 A1* | 5/2017 | Chen ................. G06K 9/00785 |
| 2017/0146801 A1 | 5/2017 | Stempora |
| 2017/0178352 A1 | 6/2017 | Harmsen et al. |
| 2017/0200061 A1 | 7/2017 | Julian et al. |
| 2017/0221149 A1 | 8/2017 | Hsu-Hoffman et al. |
| 2017/0243399 A1 | 8/2017 | Troy et al. |
| 2017/0248952 A1 | 8/2017 | Perkins et al. |
| 2017/0253236 A1 | 9/2017 | Hayakawa |
| 2017/0287163 A1 | 10/2017 | Kaufmann et al. |
| 2017/0292848 A1 | 10/2017 | Nepomuceno et al. |

(56) References Cited

U.S. PATENT DOCUMENTS

| | | |
|---|---|---|
| 2017/0293819 A1 | 10/2017 | Deng |
| 2017/0309072 A1 | 10/2017 | Li et al. |
| 2017/0314954 A1 | 11/2017 | Golding et al. |
| 2017/0345161 A1 | 11/2017 | Takatani et al. |
| 2017/0357861 A1 | 12/2017 | Okuda et al. |
| 2018/0012085 A1 | 1/2018 | Blayvas et al. |
| 2018/0039862 A1 | 2/2018 | Hyatt et al. |
| 2018/0043829 A1 | 2/2018 | Cordell et al. |
| 2018/0045519 A1 | 2/2018 | Ghadiok et al. |
| 2018/0052515 A1 | 2/2018 | Wanner et al. |
| 2018/0075309 A1 | 3/2018 | Sathyanarayana et al. |
| 2018/0107882 A1 | 4/2018 | Ogata et al. |
| 2018/0115711 A1 | 4/2018 | Kato et al. |
| 2018/0172454 A1 | 6/2018 | Ghadiok et al. |
| 2018/0176173 A1 | 6/2018 | Keysers et al. |
| 2018/0186366 A1 | 7/2018 | Gordon et al. |
| 2018/0204111 A1 | 7/2018 | Zadeh et al. |
| 2018/0229770 A1 | 8/2018 | Kataoka et al. |
| 2018/0232583 A1 | 8/2018 | Wang et al. |
| 2018/0239144 A1 | 8/2018 | Woods et al. |
| 2018/0259353 A1 | 9/2018 | Tsurumi et al. |

FOREIGN PATENT DOCUMENTS

| | | |
|---|---|---|
| GB | 2506365 A | 4/2014 |
| WO | 2014154771 A1 | 10/2014 |
| WO | 2015184578 A1 | 12/2015 |
| WO | 2016135561 A1 | 9/2016 |
| WO | 2016179303 A1 | 11/2016 |
| WO | 2018039560 A1 | 3/2018 |

OTHER PUBLICATIONS

Guo Feng: et al. Task 3—Evaluating the Relationship Between Near-Crashes and Crashes: Can Near-Crashes Serve as a Surrogate Safety Metric for Crashes? Virginia Tech Transportation Institute, U.S. Department of Transportation, Sep. 2010.

Wei, Lijun, et al., "GPS and Stereovision-Based Visual Odometry: Application to Urban Scene Mapping and Intelligent Vehicle Localization", International Journal of Vehicular Technology, vol. 24, No. 5, Article ID 439074, 17 pages., Jan. 11, 2011.

International Search Report and Written Opinion for PCT Application No. PCT/US17/60307 dated Jan. 29, 2018.

International Search Report and Written Opinion for PCT Application No. PCT/US2017/040752 dated Sep. 14, 2017.

International Search Report and Written Opinion for PCT Application No. PCT/US2017/051629 dated Nov. 16, 2017.

International Search Report and Written Opinion for PCT Application No. PCT/US217/46134 dated Oct. 19, 2017.

"International Search Report and the Written Opinion of the International Searching Authority, Application No. PCT/IB2018/000759, dated Nov. 30, 2018.".

* cited by examiner

SYSTEM AND METHOD FOR ADVERSE VEHICLE EVENT DETERMINATION

CROSS-REFERENCE TO RELATED APPLICATIONS

This application is a divisional application of U.S. application Ser. No. 16/011,013, filed 18 Jun. 2018, which claims the benefit of U.S. Provisional Application No. 62/521,058, filed 16 Jun. 2017, both of which are incorporated herein in their entirety by this reference. These applications are related to U.S. application Ser. No. 15/892,899, filed 9 Feb. 2018, which is incorporated herein in its entirety by this reference.

TECHNICAL FIELD

This invention relates generally to the automotive analysis field, and more specifically to a new and useful system and method for adverse vehicular event determination in the automotive analysis field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
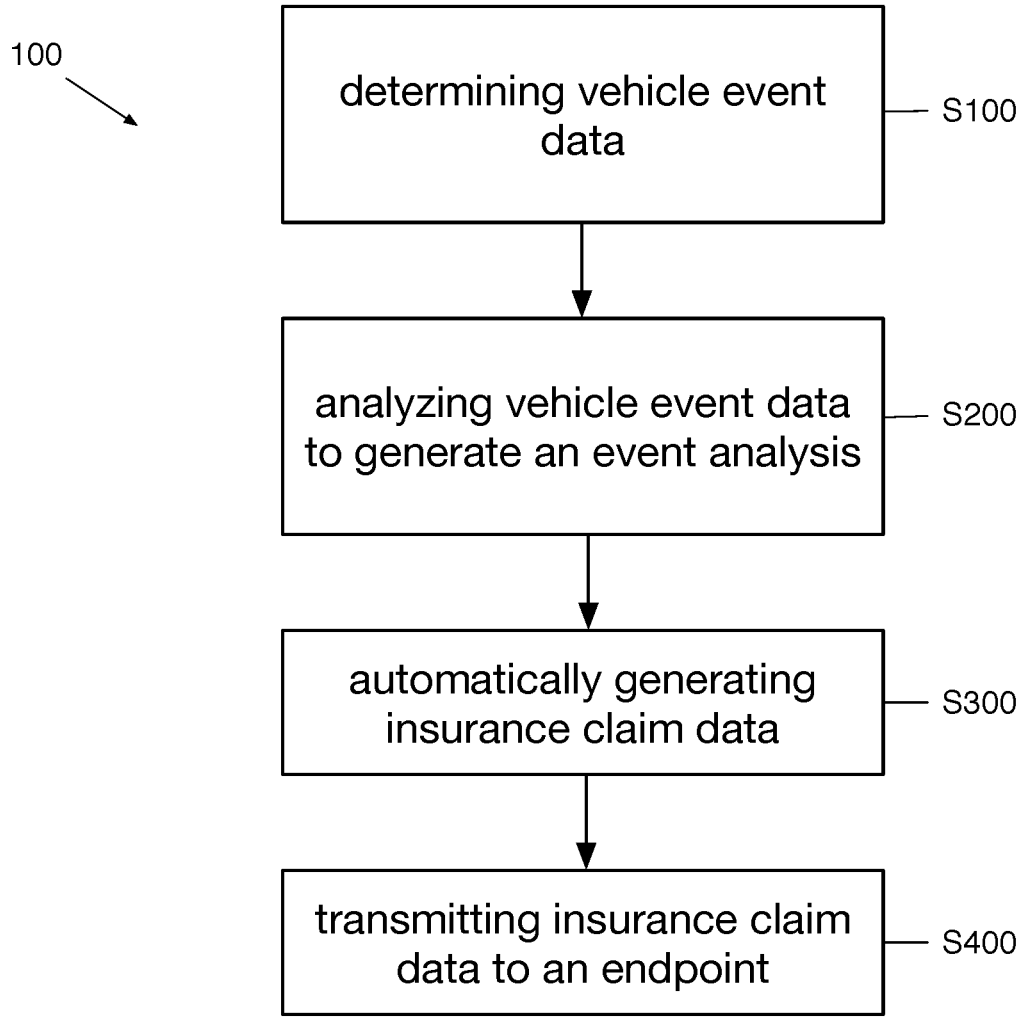
FIG. 1 is a flowchart representation of a variation of the method of adverse vehicle event determination.

As shown in FIG. 1, the method for adverse vehicle event determination includes: determining vehicle event data; analyzing vehicle event data to generate an event analysis; automatically generating insurance claim data based on the event analysis; and transmitting insurance claim data to an endpoint.

The method functions to determine that an adverse vehicle event has occurred. The method can also function to determine characteristics of the adverse vehicle event (e.g., severity, anticipated monetary cost, etc.). The method can also function to generate insurance claim data based on the characteristics of the adverse vehicle event. The method can also function to provide the insurance claim data (e.g., data that can be used to open or file an insurance claim, a first notice of loss/FNOL, etc.) to an entity (e.g., an agent at an insurance company, a vehicle-history monitoring service, etc.).

The method is preferably performed in response to occurrence of a vehicle event (e.g., a sharp change in the vehicle attitude, impact of the vehicle with another object, receipt of a notification of vehicle damage, receipt of new sensor information, determination of vehicle event data, etc.). However, the method can additionally or alternatively be performed continuously in real- or near-real time, asynchronously, or at any other suitable time. In variations, the method is performed iteratively at a predetermined frequency (e.g., once per millisecond), performed a single time during a time period defined between a vehicle ignition time point and a vehicle turning-off time point, performed a single time for the vehicle, and/or be performed at any suitable frequency. In further variations, the method is performed after verification from a user (e.g., a crash is detected, followed by transmission of verification notifications to one or more user devices, followed by receipt of verification by the user, and finally followed by generation of insurance claim data). However, performance of the method can have otherwise suitable temporal characteristics.

Figure 3:
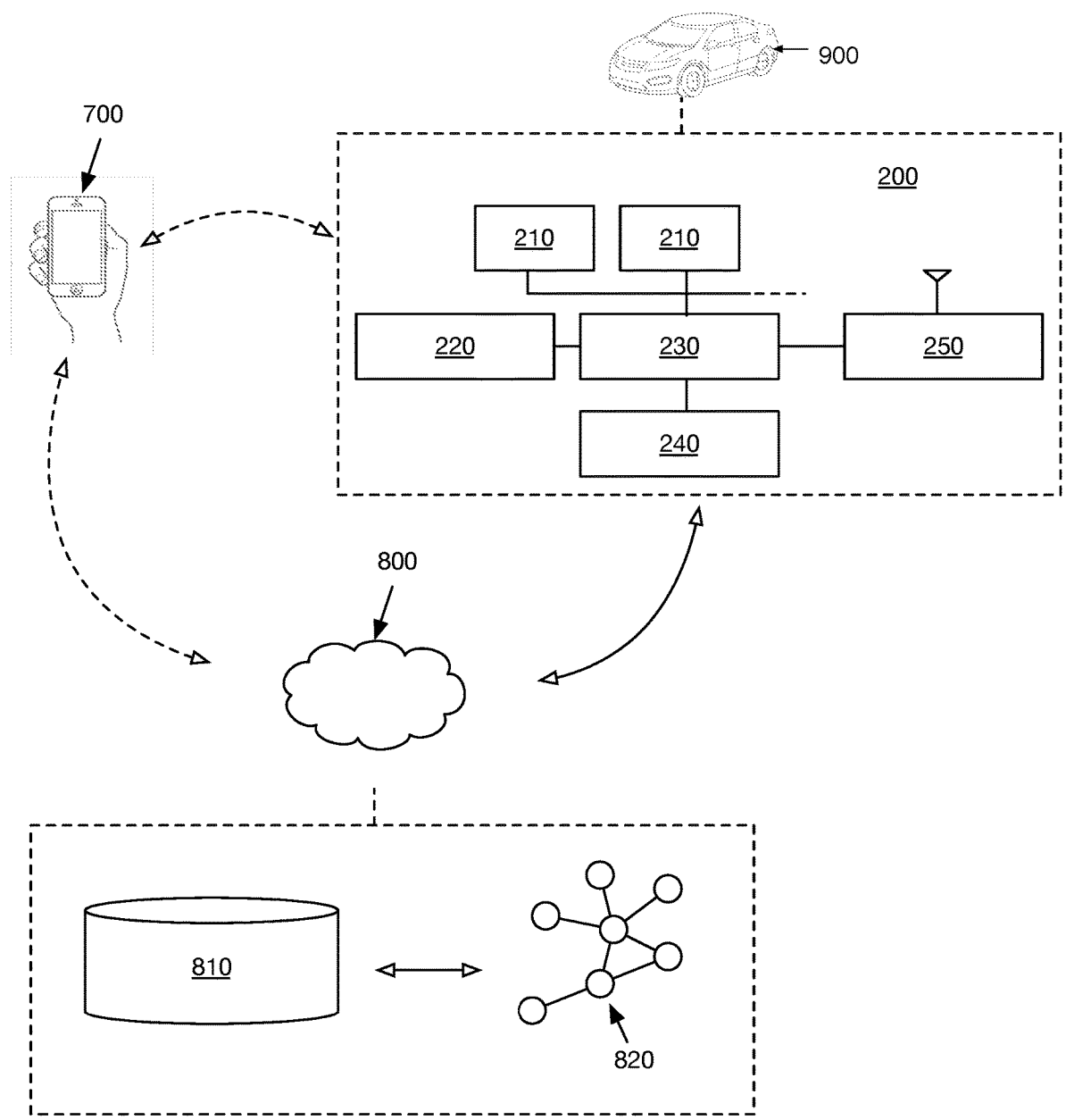
FIG. 3 is a flowchart representation of example interrelated systems associated with an example implementation of the method.

As shown in FIG. 3, the method and/or variations thereof can be performed by and/or implemented at various related systems. The method is preferably performed related to a physical vehicle 900 traversing through a physical volume, but can additionally or alternatively be performed for a virtual model (e.g., of a vehicle) or otherwise suitably performed. The physical vehicle can be an automobile, a motorcycle, a bicycle, a skateboard, an aerial system (e.g., a drone, plane, etc.), or be any other suitable vehicle. The vehicle can be driven by a human driver, be automatically controlled, be telematically controlled (e.g., by a teleoperator), or be otherwise suitably controlled. The method is preferably performed for a single vehicle, but can additionally or alternatively be performed for a plurality of vehicles, a pair of vehicle involved in a vehicle event (e.g., in a crash), and/or any other suitable number and/or grouping of vehicles. The vehicle 900 is preferably equipped with an onboard vehicle system 200. The onboard vehicle system 200 preferably includes one or more sensors 210 (e.g., permanently integrated with the vehicle, installed in a removable dashboard-mounted module, etc.), a power system 220, an onboard processing system 230 (e.g., a vehicle computer), a memory system 240 (e.g., onboard FLASH memory storage), and a communication module 250. However, the vehicle can include any other suitable subsystems and/or components, either integrated into the vehicle (e.g., during manufacturing, as an aftermarket add on, etc.), coupled to a removable module (e.g., a mobile device, a dashboard-mounted system, etc.), and/or otherwise suitably associated with the vehicle. Variations of the method are preferably performed at least partially at a remote computing system 800 (e.g., a remote server), which can include one or more databases 810 (e.g., for storing data and/or from which to retrieve data) and analysis modules 820 (e.g., for performing any Blocks of the method and/or variations and examples thereof). Various blocks of the method can be performed in cooperation with a mobile device 700 associated with an occupant of the vehicle (e.g., an occupant device, a user device) or with another entity. However, the method and/or portions thereof can be otherwise suitably performed with any suitable system(s).

2. Benefits

Variants of the systems and/or methods can confer several benefits and/or advantages.

First, variants of the method can include automatically generating insurance claim data, including first notice of loss (FNOL) messages (e.g., reports), to simplify and streamline handling and management of insurance claims. For example, the method can reduce the cost of collecting and organizing necessary information for an FNOL. The method can also enable timely provision of FNOLs to insurance entities (e.g., agencies, agents, underwriters, etc.) by reducing and/or eliminating the need for a human adjuster to assess the claim information. The method can also enable more accurate claim adjustment (e.g., by providing high quality data, such as video data, with the FNOL in order to determine characteristics of an adverse vehicle event leading to the FNOL such as accident fault, severity, additional parties involved, behavior of the driver, presence of injury of driver and/or other occupants, other risk events leading up to or otherwise proximal in time to the collision, etc.).

Second, variants of the method can enable automatic identification of parties involved in an adverse vehicle event (e.g., associating participant or party identities or identifiers with insurance claim data, simplifying and/or streamlining claim routing, enhancing claim routing efficiency, etc.). The method can include identifying a driver of the vehicle (e.g., using an interior camera that records interior video and/or images, using user profile data associated with the driver, using driver behavior signature pattern matching, etc.), identifying one or more passengers of the vehicle (e.g., using anonymized or non-anonymized interior imagery, data links with mobile devices of vehicle passengers, etc.), identifying other vehicular participants in an adverse vehicle event (e.g., a second vehicle involved in a crash with the primary vehicle, via exterior video data, image recognition, license-plate identification, etc.), identifying occupants of other vehicular participants of an adverse vehicle event (e.g., via facial recognition algorithms implemented on exterior imagery collected by the primary vehicle), and/or performing any suitable identification and/or recognition.

Third, variants of the method can improve customer relations management (CRM) for insurance entities (e.g., companies, agencies, underwriters, etc.), for whom FNOL generation and receipt can be a time- and resource-intensive, customer-facing process. For example, the method can include providing insurance claim data (e.g., an FNOL) to an insurance entity (e.g., a claims agent, an insurance provider, a representative of an insurance provider, etc.) automatically, and with relevant vehicle event data (e.g., collision data, fault statuses of one or more participants in a collision or other loss event, etc.), with or without a human manually submitting a claim (e.g., approving an FNOL submission, providing claim data to an application, etc.). In such variants, the method can enable insurance entities to reduce claims processing time by having the requisite data for claim resolution provided automatically, and/or to reduce follow-up time to ensure accurate insurance claim data. In another example, the method can include comparing manually submitted claims data (e.g., by an collision or adverse event participant)

Fourth, variants of the method can include automatically reporting vehicle events to various services (e.g., vehicle-history reporting services, emergency services, insurance claim adjusters, etc.). The method can provide rich data to such services that enable the services to modify their responses to a vehicle event (e.g., crash severity, estimation of injury type and likelihood, vehicle telemetry data, etc.).

Fifth, variants of the method can enable interaction between an onboard vehicle system and a user device (e.g., a mobile device of the user, a portable computer of the user, etc.), which can facilitate efficient collection and reporting of insurance claim data. For example, the onboard vehicle system can sample sensor data (e.g., of onboard vehicle system sensors) and process the sampled sensor data to determine an adverse vehicle event has occurred, automatically populate a report with insurance claim data and tag the report with sensor data (e.g., video data) from the adverse vehicle event, and transmit the report to a user device. At the user device, an application (e.g., a client application executing on the user device) can notify the user that an adverse event has occurred, request approval of the insurance claim data depicted by the report, and/or perform any other suitable action. In another example, the onboard vehicle system can utilize short-range communication protocols (e.g., Bluetooth, BLE, etc.) to transfer data to the user device, and the user device can utilize long-range communication protocols (e.g., cellular radio transmission, wireless internet transmission, etc.) to transfer data to a remote computing system; in such examples, the user device can function as a communication relay for the onboard vehicle system.

Sixth, variants of the method and system can enable determination of an adverse vehicle event using imagery exclusively (e.g., without auxiliary sensor input such as accelerometer data, audio data, etc.). For example, kinematic motion of the vehicle in which the onboard vehicle system is installed (e.g., the ego-vehicle) can be extracted from image data (e.g., video sequences, image streams, video streams, singe image frames, etc.). Kinematic motion can include ego-vehicle acceleration and deceleration, attitudinal shift (e.g., heading change, orientation change, etc.), impact parameters (e.g., jerk, whiplash, bounce, impulse, and other parameters during or in. relation to impact of an object with the ego-vehicle, etc.), and any other parameters or values that describe the motion of the vehicle. Using imagery can enable an image processing module to be used to determine vehicle event data, and the image processing module can be locally or remotely located (e.g., and the same or substantially similar processed output can be obtained). In examples, a population of vehicles having corresponding onboard vehicle systems, wherein each onboard vehicle system includes a substantially identical camera model (e.g., a camera defining the same or substantially similar operating parameters such as resolution, effective shutter speed, color response, etc.), can generate imagery data gathered under various vehicle operating conditions that can then be analyzed using a centralized image processing module without the need to account for differing vehicle dynamics (e.g., vehicle dynamics may not affect relevant properties of the image data, whereas vehicle dynamics may affect signal characteristics of inertial measurements). In related examples, image data can be similarly unaffected by vehicle-specific dynamics in determining vehicle event data (e.g., adverse vehicle event data) for any individual vehicle (e.g., ego-vehicle).

Seventh, variants of the method allow insurance entities (e.g., insurance providers) to automatically or manually pull information supporting a claim (e.g., video collected before, after, and/or during a collision) from the system (e.g., from remote computing system 800). In one example, the insurance entities can request supporting information from the system, wherein the request can include: a collision identifier (e.g., vehicle identifier, timestamp, geolocation, driver identifier), an access credential (e.g., an API key assigned to the entity), the type of requested information, and/or any other suitable information.

However, the method, related systems, and variants thereof can additionally or alternatively afford any other suitable benefits and/or advantages.

3. Method

The method includes Block S100, which includes determining vehicle event data. Block S100 functions to obtain data (e.g., information, signals, sensor data, etc.) related to a vehicle event (e.g., describing a vehicle event, during a vehicle event, subsequent to a vehicle event, prior to an imminent vehicle event, etc.) for use in other Blocks of the method. Block S100 can also function to monitor vehicle operation and/or driver behavior. Block S100 can also function to track vehicle usage. Determining vehicle data can include collecting vehicle sensor data, collecting vehicle identification data, determining driver behavior data, and determining occupant data, as well as any other suitable sub-blocks. Block S100 can include extracting vehicle event data from sensor data (e.g., via analyzing sensor data to determine vehicle event parameters, event parameters, etc.). Sub-blocks of Block S100 can be concurrently, sequentially, asynchronously, and/or otherwise suitably performed with any suitable temporal characteristics.

Block S100 is preferably performed by an onboard vehicle system coupled to the vehicle. The onboard vehicle system can include one or more cameras, an accelerometer, an inertial measurement unit (IMU), a gyroscope, a GPS module, and any other suitable sensors. However, the onboard vehicle system can additionally or alternatively include any suitable sensors, and omit any suitable sensors. In an example, the onboard vehicle system includes an imaging module that includes an interior-facing camera and an exterior-facing camera, wherein the imaging module is installed at the dashboard of the vehicle (e.g., coupled to the windshield proximal the dashboard, attached to a support member of the dashboard, mounted to the windshield proximal the rearview mirror, etc.). In this example, the onboard vehicle system also includes a plurality of IMUs and a wireless communication link (e.g., to a mobile device associated with a vehicle occupant, to an onboard diagnostic module/OBD module coupled to the vehicle, etc.). In another example, the onboard vehicle system includes only image sensors (e.g., cameras, optical sensors, etc., without any inertial or other auxiliary sensors), a wireless communication link, and a processing system (e.g., including a processor, onboard memory, any other suitable computing components, etc.). However, the onboard vehicle system can include any other suitable components.

Determining vehicle event data is preferably performed substantially continuously (e.g., continuously sampling). For example, the onboard vehicle system of the vehicle can continuously record interior and exterior video imagery and maintain a rolling buffer (e.g., a 10 minute buffer, a 20 minute buffer, a five hour buffer, an adjustable buffer, any suitable buffer, etc.). In a related example, determining vehicle event data can include storing gathered sensor data (e.g., losslessly storing uncompressed data, storing in a lossy manner via compression, storing all gathered sensor data, storing some gathered sensor data, etc.) on-board the vehicle, and/or transmitting sensor data (e.g., video imagery) off-board the vehicle. In alternatives, determining vehicle event data can be performed in response to user input (e.g., in response to activating a record button of the onboard vehicle system), periodically (e.g., once per minute, once per second, any suitable periodicity), and/or asynchronously. However, determining vehicle event data can include gathering, transferring, and/or otherwise manipulating vehicle event data with any suitable temporal characteristics.

In relation to Block S100, sensor data can be captured and/or sampled in response to a trigger. For example, Block S100 can include sampling an accelerometer signal from an accelerometer of the onboard vehicle system (e.g., substantially continuously, periodically during vehicle operation, etc.), and triggering data capture (e.g., image data sampling, video capture, etc.) when the accelerometer signal exceeds a threshold value (e.g., corresponding to a rapid acceleration, heading deviation, deceleration, etc.). The threshold value can be predetermined (e.g., based on historical behavior), dynamically determined (e.g., based on present vehicle speed and/or heading, based on present vehicle acceleration, etc.), and/or otherwise suitably determined.

Sampling data in response to a trigger can function to allow adverse vehicle events to be determined in unexpected situations (e.g., in environments that can be difficult to continuously monitor, when the ego-vehicle is behaving nominally and a secondary vehicle collides with it, etc.). For example, in variations wherein the onboard vehicle system includes an accelerometer, Block S100 can include sampling an accelerometer signal from the accelerometer at a time point prior to the time interval in which an adverse vehicle event occurs (e.g., a sideswipe of the ego-vehicle by a passing vehicle, a perpendicular collision of a secondary vehicle into the ego-vehicle in an intersection, etc.), and sampling the interior image data and the exterior image data in response to the accelerometer signal exceeding a threshold value (e.g., when onset of the unexpected adverse vehicle event causes the accelerometer signal to exceed a threshold value, rate of change, etc.). In such variations, the interior and/or exterior image data can be continuously collected and overwritten in a buffer and sampled from an interval based on the trigger (e.g., an accelerometer signal-based trigger, any other suitable trigger, etc.), collected asynchronously in response to the trigger (e.g., wherein image recordation occurs subsequent to trigger determination or receipt), and/or collected in any other suitable manner.

In a specific implementation in accordance with Block S100, the ego-vehicle can be parked (e.g., positioned in a parking space and stationary) and be involved in a collision with a moving secondary vehicle at a time point. Contemporaneously with the time point, the accelerometer signal can exceed a threshold value as a result of the collision (e.g., wherein the accelerometer is operable in a low-power standby mode and substantially instantaneously awakened by a movement-sensitive switch in response to the collision), and trigger image recordation by the onboard vehicle system (e.g., to enable participant identifiers, such as those corresponding to the secondary vehicle, to be determined, and for insurance claim data such as an FNOL to be automatically generated and transmitted to an endpoint such as an insurer of the ego-vehicle).

Collecting vehicle sensor data functions to obtain data from sensors of the vehicle (e.g., in-built sensors, third-party sensors). Collected sensor data can include video data (e.g., from a forward and/or rearward facing vehicle camera, a dashboard-mounted camera with inward and/or outward facing cameras, a windshield-mounted onboard vehicle system, etc.), inertial data, location data, and other suitable data. Collected sensor data can optionally include data (e.g., exterior video, kinematic data, etc.) collected by a second or third vehicle, such as the other vehicle in the collision or adverse event, a vehicle proximal the collision site, or any other suitable vehicle. Collected sensor data can also include extracted parameters and/or characteristics of video and other sensor data, such as information regarding nearby objects (e.g., object classification, object trajectories, speeds, velocities, etc.), elapsed driving time, and other suitable extracted data. Collected sensor data can also include environmental data (e.g., weather data, temperature data, precipitation data, wind speed data, visibility data, etc.). However, collecting vehicle sensor data can otherwise include collecting any suitable sensor data in any suitable manner.

Collecting vehicle identification data functions to determine the unique vehicle(s) (e.g., participants, parties, etc.) involved in a vehicle event (e.g., an adverse vehicle event, a collision, etc.). The unique vehicles can include the vehicle in which the onboard vehicle system is installed (e.g., the ego-vehicle), but can additionally or alternatively include surrounding vehicles. Unique vehicles involved in a vehicle event can include event participants and/or identifiers thereof (e.g., participant identifiers). Vehicle identification data can include: a vehicle identification number (VIN), vehicle licensing information (e.g., license plate number, taxicab number, livery number, rideshare identification number, etc.), a vehicle maintenance history report, insurer information (e.g., insurer name, policy holder, policy underwriter, etc.), visually apparent vehicle features (e.g., vehicle color, vehicle markings, vehicle shape, visible vehicle components, etc.), and any other suitable data intrinsic to a particular vehicle or vehicles. Vehicle identification data can be collected in any suitable manner, including by associating a user device with vehicle identification data in a database (e.g., a remote database), receiving vehicle identification entered manually by a user (e.g., at an application executing on a mobile device of a user associated with the vehicle), retrieving vehicle identification from a remote database (e.g., from an API based on VIN lookup), identifying a vehicle identifier pre-associated with the onboard vehicle system, and/or in any other suitable manner.

In a specific example, Block S100 can include sampling sensor data over a time interval using an onboard vehicle system rigidly coupled to an ego-vehicle (e.g., to an inner surface of the windshield of the ego-vehicle). In a related specific example, Block S100 includes sampling interior image data over a time interval using an interior-facing camera of an onboard vehicle system rigidly coupled to an ego-vehicle, and contemporaneously sampling exterior image data over the time interval using an exterior-facing camera of the onboard vehicle system. In these examples, the image data is sampled from a monocular camera; however, in alternative examples, the image data can additionally or alternatively be sampled from any suitable camera or image sensor (e.g., a stereocamera, an ambient light sensor, a multi-spectral camera, etc.).

Collecting driver behavior data functions to obtain information indicative of driver behavior (e.g., driver of the vehicle) associated with a vehicular event. Driver behavior data can include video data (e.g., from a camera pointing inwards toward the occupants of the vehicle including the driver, passengers, etc., from a front facing camera, from an IMU, etc.), extracted parameters and/or characteristics of imagery and other data (e.g., distraction level from eye movements, distraction level from mobile device use frequency while vehicle is moving, tailgating behavior, etc.), and any other suitable data. In a specific example, determining driver behavior includes determining a behavioral risk score based on an analytical model of driver behavior correlated with adverse vehicle event occurrence (e.g., collected from instances of the method implemented on a population of vehicles and drivers, stored and retrieved historic data, etc.). However, collecting driver behavior data can include collecting any suitable data related to driver behaviors in any other suitable manner.

Collecting driver behavior data in accordance with variations of Block S100 can include determining driver behavior data based on sensor measurements (e.g., sampled sensor streams, captured sensor data, etc.). In relation to collecting driver behavior data, Block S100 can include extracting driver behavior data from image data. The driver behavior data can correspond to a driver of the ego-vehicle, a driver of another vehicle (e.g., a participant in an adverse vehicle event, a collision, etc.). In a first variation, driver behavior data is collected using one or more cameras, including an interior-facing camera. The interior camera's field of view preferably includes all or a portion of the driver's head, and can optionally include all or a portion of the passenger-side volume (e.g., the passenger's body or head), all or a portion of the rear seats, all or a portion of the rear window, the driver's side window(s), the passenger side window(s), or include any other suitable portion of the vehicle interior. The image(s) can be used to optically identify and/or track the driver's head position, head movement, eye position (e.g., gaze direction), eye movement, parameters thereof (e.g., duration, angle, etc.), or determine any other suitable distraction factor value. The image(s) can additionally be used to determine the driving context, such as whether there is a passenger in the vehicle or where the passenger is located, the environment around the vehicle visible through the vehicle windows, and/or any other suitable context derivable from the image(s). The image(s) can additionally be used to verify or validate other determinations of driver behavior. For example, driver interaction with a user device (e.g., phone) can be verified when the user device is present in the concurrently recorded image. The image can be a visual spectrum image, hyperspectral image, IR image, or be sampled at any other suitable wavelength. The image can be recorded using ambient light, light emitted by a light emitter (e.g., from an LED flash, etc.), or using any other suitable light source. The image can be a stereoimage (e.g., recorded by a stereocamera), a two dimensional image (e.g., recorded by a monocular camera), a single image, or be any other suitable image.

In a second variation of Block S100, the sensor measurements include cabin audio (e.g., vehicle interior noise), which can be sampled by the audio sensor arranged proximal the driver's volume (e.g., integrated with the onboard system, part of a user device associated with the driver, etc.) or otherwise sampled. The cabin audio can be used to infer the driver head position, the driving context (e.g., whether the driver is calm, whether there is a child in the vehicle, etc.), or be otherwise used. The cabin audio preferably includes driver audio, and can optionally include passenger-side audio, rear-seat audio, vehicle audio (e.g., generated by the vehicle), road noise, radio audio, notification audio, or any other suitable audio stream. The cabin audio can be a single stream (e.g., recorded by a single audio sensor), multiple streams (e.g., recorded by multiple collocated or distal audio sensors, wherein the cabin audio is recorded in stereo, etc.), or include any suitable number of audio streams.

In a third variation of Block S100, the sensor measurements include user device operation parameters, which can be determined by a user device associated with the user or otherwise determined. User device operation parameters can include the user device's: processing load (e.g., as determined from an activity monitor, the CPU load, the GPU load, etc.), processing load changes, power consumption, touch input operation, sensor measurements, or any other suitable set of operation parameters. User device sensor measurements can include user device kinematics, pressure, temperature, ambient light obstruction, or any other suitable parameter measurement indicative of driver interaction with the user device. The user device operation parameters can be determined by one or more clients (e.g., applications, SDKs on multiple applications, etc.) running on the user device, or be otherwise determined. In one example of the variation, processing load increases can be indicative of user interaction with the user device. In a second example of the variation, touch input operation can be indicative of user entering data into the user device. In a third example of the variation, user device vibration can be indicative of the user device being knocked by the user. In a fourth example, user device translation can be indicative of the user device being lifted or picked up by the user. In a fifth example, an increase in the sampled user device ambient pressure or temperature can be indicative of the user device being held. However, any other suitable user device parameter can be monitored for user interaction with the user device.

In a fourth variation of Block S100, the sensor measurements include an image or video (e.g., set of images) of the vehicle exterior, which can be sampled by the outward-facing camera directed toward the front of the vehicle (e.g., through the front windshield) or otherwise sampled. The camera's field of view preferably includes all or a portion of the roadway oriented toward the front the vehicle (e.g., the foreground toward the front of the vehicle, the lane in which the vehicle is moving, the adjacent lane or lanes, etc.), and can optionally include the region(s) to the sides of the vehicle (e.g., the driver's side, the passenger's side), to the rear of the vehicle, above the vehicle (e.g., through a sunroof and/or moon-roof), or include any other suitable portion of the environment outside the vehicle. The image(s) can be used to optically identify and/or track the vehicle's position within the environment (e.g., localize the vehicle), position within a lane, position relative to other objects (e.g., vehicles, pedestrians, etc.), or determine any other suitable parameter value. The image(s) can additionally be used to determine the driving context, such as whether there is a second vehicle in front of or beside the vehicle in which the sensor is emplaced. The image(s) can additionally be used to determine, verify, and/or validate other determinations of driver behavior. For example, driver attentiveness can be measured based on an amount and/or frequency of lateral drifting within a lane of the roadway. Drifting within a lane can be based on vehicle path extraction (e.g., extraction of the vehicle trajectory from the image or images) and comparison to lane markers extracted from images of the road. The image can be a visual spectrum image, hyperspectral image, IR image, or be sampled at any other suitable wavelength. The image can be recorded using ambient light, light emitted by a light emitter (e.g., from an LED flash, etc.), or using any other suitable light source. The image can be a stereoimage (e.g., recorded by a stereocamera), a single image, or be any other suitable image.

In a fifth variation of Block S100, the sensor measurements include a kinematic signal. The kinematic signal is preferably indicative of a kinematic variable of the vehicle (e.g., acceleration, velocity, position, jerk, etc.), but can additionally or alternatively be indicative of any suitable motion variable associated with the vehicle and/or vehicle occupants (e.g., the driver, a passenger, etc.). The kinematic signal is preferably collected by a kinematic measurement mechanism (e.g., inertial measurement unit) of the onboard system, but can additionally or alternatively be collected by any other suitable component. In a first example, the sensor measurements include an accelerometer output of an inertial measurement unit of the onboard system. However, the sensor measurements can otherwise include any suitable kinematic signal, vehicle information (e.g., steering wheel position, pedal position), indicator, or other information.

In variations, collecting driver behavior data and/or distraction data in accordance with Block S100 can include determining driver distraction substantially as described in U.S. patent application Ser. No. 15/805,348, filed 16 Jan. 2018, which is incorporated herein in its entirety by this reference. However, in additional or alternative variations, driver behavior and/or distraction can be otherwise suitably determined.

Determining occupant data functions to collect data that is intrinsic to the driver and/or passenger(s) of the vehicle. Determining occupant data can include determining occupant data based on image processing applied to imagery from an internal facing camera (e.g., performing facial recognition on an image of the cabin of the vehicle). In a specific example, image processing applied to imagery can include automatically anonymizing the image data using an iterative algorithm in which the image data is iteratively blurred for an increasing number of frames of a video sequence until facial recognition on the blurred image fails. Determining occupant data can also include counting a number of vehicle occupants (e.g., determining a number of occupants), counting a number of passengers of the vehicle (e.g., as distinct from a driver of the vehicle), determining the vehicle's or driver's insured status, or determining any other suitable data. Determining occupant data can include determining identifying data pertaining to occupants of the vehicle (e.g., of the driver), which can include a license number, a registration number, an occupant identity (e.g., name), other occupant identifying info (e.g., address, phone number, sex, gender, height, weight, eye color, hair color, etc.), insurance policy number, and/or any other suitable occupant identifying data. Occupant identifying data can be collected in any suitable manner, including by retrieving occupant identifying data from a database associated with a user account of the occupant, manually input by an occupant, automatically determined using facial recognition algorithms and associated third party databases (e.g., social media databases), and/or in any other suitable manner. Determining occupant data is preferably based on image data (e.g., sampled from one or more cameras of the onboard vehicle system), but can additionally or alternatively be based on other sensor data (e.g., such as via automatically determining a number of occupants based on a number of different voices detected in a sampled audio stream of cabin sound).

In relation to determining occupant data, Block S100 can include determining a number of occupants based extracted participant identifiers. In examples, extracting one or more participant identifiers can include extracting participant identifiers related to multiple participants within a single vehicle (e.g., occupants), and counting the number of unique participant identifiers determined (e.g., based on facial recognition of multiple faces in an interior image data frame). Additionally or alternatively, identifying characteristics besides the number of occupants can be determined (e.g., identifying data as described above). Determining occupant data is preferably performed within a time interval (e.g., contemporaneously with a time interval in which vehicle event data is determined), but can additionally or alternatively be performed outside the time interval (e.g., before a vehicle event occurs, proximal in time to the beginning of a driving session, or after a vehicle event occurs, immediately subsequent to the determination of an adverse vehicle event to determine who was involved in the adverse vehicle event occurrence, etc.), and/or at any other suitable time. Determining occupant data is preferably performed with respect to the ego-vehicle, but can additionally or alternatively be performed in relation to other vehicles (e.g., a vehicle involved in a collision or other adverse vehicle event with the ego-vehicle); for example, Block S100 can include determining a number of occupants of a secondary vehicle that is involved in a head-on collision with the ego-vehicle, and utilize the number of occupants in further blocks of the method (e.g., in automatically contacting emergency services with a report of a total number of likely injured persons, demographic data regarding the injured persons, etc.).

In variations, Block S100 can include extracting vehicle event data from sensor data (e.g., image data). For example, Block S100 can include extracting vehicle event data from the interior image data and the exterior image data (e.g., using a processor of the onboard vehicle system). The vehicle event data thus extracted is preferably associated with a vehicle event occurring within a time interval (e.g., wherein the time interval is determined automatically in response to a trigger, wherein the time interval is a periodic time interval of any suitable duration, etc.); however, the event data can additionally or alternatively be associated with a vehicle event occurring outside the time interval and/or be extracted in response to a trigger (e.g., directly subsequent to trigger detection). Extracting the vehicle event data can include extracting a set of event parameters, wherein various event parameters define aspects (e.g., quantifiable aspects, qualitative aspects, etc.) of the vehicle event. For example, extracting the set of event parameters can include extracting: a plurality of participant identifiers (e.g., wherein each event participant identifier can be associated with insurance policy data corresponding to a participant in the vehicle event); an acceleration (e.g., average acceleration, peak acceleration, etc.) of the ego-vehicle (e.g., during the time interval); an attitudinal shift (e.g., peak attitudinal shift, average attitudinal shift, total orientation change, average angular motion, etc.) of the ego-vehicle (e.g., during the time interval); and any other parameters associated with the vehicle event.

Figure 5:
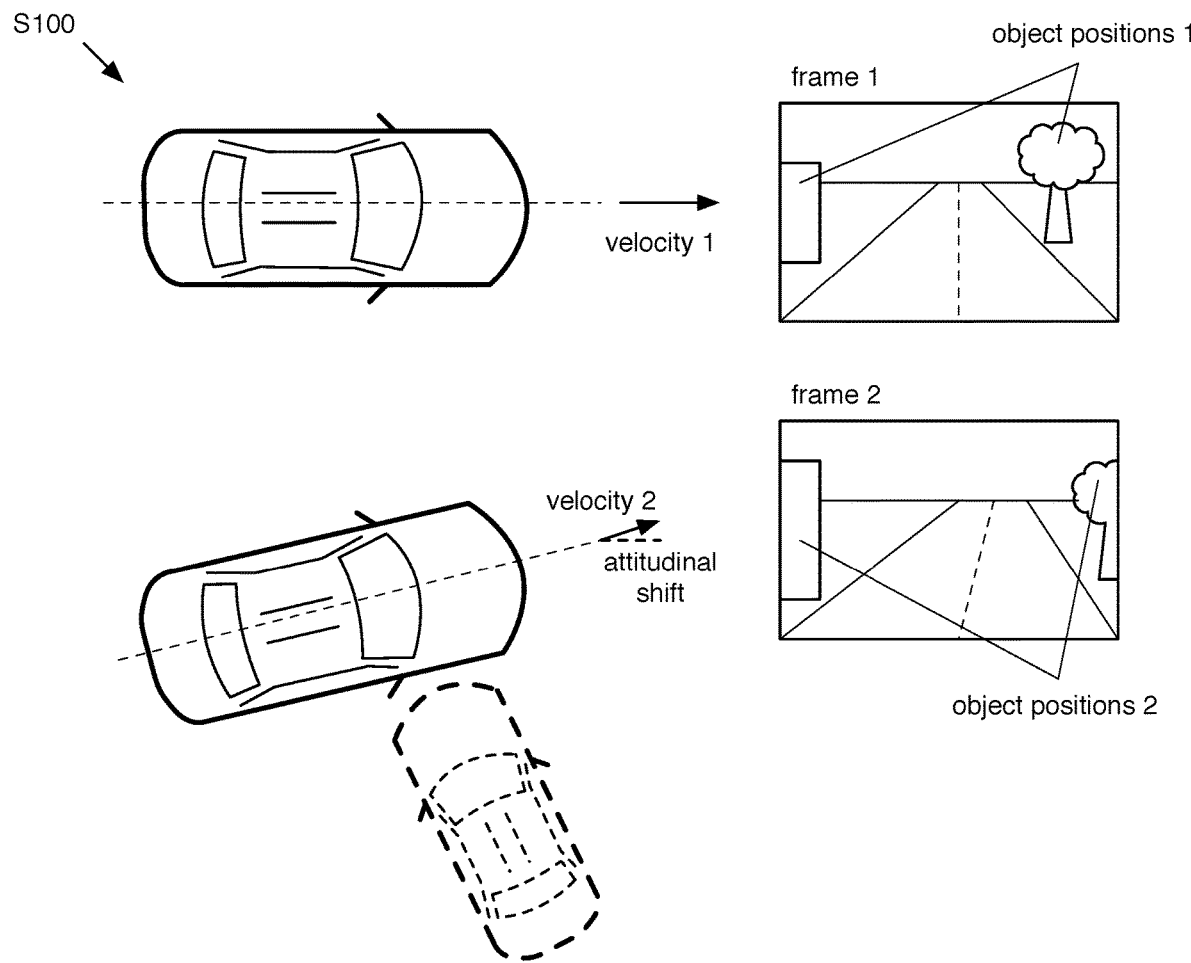
FIG. 5 depicts a diagram of a specific implementation of a portion of the method.

Block S100 can include extracting event parameters from image data (e.g., exclusively from image data without any auxiliary data). For example, as shown in FIG. 5, Block S100 can include extracting the attitudinal shift (e.g., peak attitudinal shift) of the ego-vehicle by determining a first position of each object depicted in a first frame (e.g., of exterior image data, at a first time point, within a time interval, etc.), determining a second position of each object depicted in a second frame (e.g., of the exterior image data, at a second time point, subsequently within the time interval, etc.), and calculating the attitudinal shift of the ego-vehicle based on a comparison between the first position of each object and the second position of each object (e.g., by determining the magnitude of the shift of each object within the image frame, and calculating the peak attitudinal shift by taking the shift corresponding to the greatest magnitude out of each of the object). In this example, the position of each object can be defined in three dimensions (e.g., in three dimensional space surrounding the ego-vehicle) and extracted using a method for 3D reconstruction (e.g., a trained position classifier, an inverse rendering technique, etc.); however, the position of each object can additionally or alternatively be defined in two dimensions (e.g., relative to a boundary of the frame, relative to a projected plane on which the ego-vehicle is located, etc.) and the shift in position can be a projected shift (e.g., a projection of the three dimensional object displacement onto two dimensions) and/or otherwise suitably defined.

In another example of extracting event parameters from image data, Block S100 can include extracting the peak acceleration of the ego-vehicle by determining a first velocity of each object depicted in the first frame (e.g., of exterior image data, at a first time point, over a first sub-interval of a time interval defined by two or more frames, etc.); determining a second velocity of each object depicted in the second frame (e.g., of exterior image data, at a second time point, over a second sub-interval of a time interval subsequent to the first sub-interval, etc.); and, calculating the peak acceleration of the ego-vehicle based on a comparison between the first velocity of each object and the second velocity of each object. In this example, the velocity of each object wherein can be defined in three dimensions (e.g., relative to the ego-vehicle), and determined using a method for 3D time-resolved event reconstruction (e.g., as described above, using any other suitable technique, etc.); however, the velocity of each object can additionally or alternatively be defined in two dimensions (e.g., relative to a frame boundary, relative to a projected plane occupied by the ego-vehicle, etc.) and/or otherwise suitably defined.

The method includes Block S200, which recites: analyzing vehicle event data to generate an event analysis. Block S200 functions to determine whether a vehicle event (e.g., vehicular event) that occurred was an adverse vehicle event (e.g., a vehicle event resulting in damage, theft, and/or loss of the vehicle, injury to an occupant of the vehicle, a substantial likelihood of damage, theft, and/or loss of the vehicle, and/or a substantial likelihood of injury to an occupant of the vehicle, etc.), and can optionally classify the event, determine the severity of an adverse vehicle event, or determine other event characteristics. Block S200 can also function to reconstruct and/or extract aspects (e.g., characteristics, parameters) of the adverse vehicle event for use in subsequent Blocks of the method (e.g., vehicle orientations, vehicle trajectories, vehicle locations, the aforementioned information as a function of time and/or space, etc.). The event analysis generated as a result of analyzing the vehicle event data preferably includes the determination of whether the vehicle event was an adverse vehicle event, but can additionally or alternatively include any suitable determined attributes of the vehicle event data.

Block S200 is preferably performed by a remote computing system, and can thus include transmitting vehicle event data to a remote computing system for analysis. Alternatively, Block S200 can be performed in a distributed fashion, distributed between a remote computing system and a local computing system (e.g., a mobile device, a vehicle computer, vehicle computing unit, electronic control unit, etc.). In a specific example of Block S200, a local computing system at the vehicle selects vehicle event data based on matching a pattern exhibited by the vehicle event data with a corresponding pattern of a set of predetermined patterns, and transmits the selected data to a remote computing system that implements a set of rules (e.g., derived from a machine learning model) on the received selected data. However, Block S200 can be otherwise suitably performed in a contiguous and/or distributed manner at any suitable computing system(s) in any suitable location(s).

Figure 2:
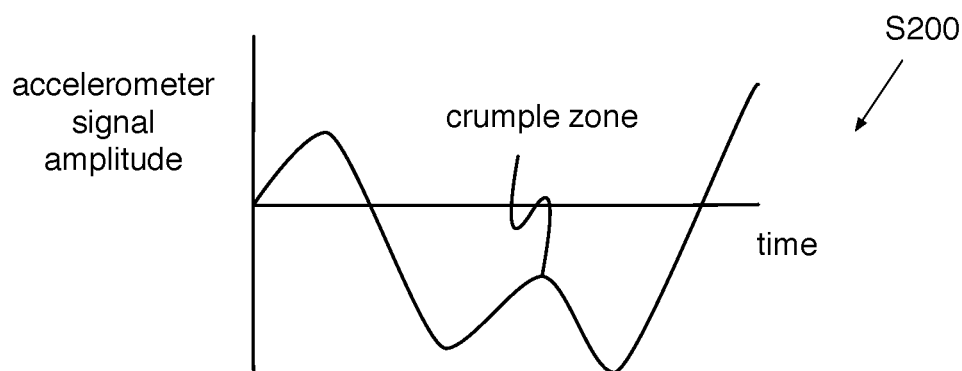
FIG. 2 is an example signal curve indicative of an adverse vehicle event in an example implementation of the method.

Block S200 is preferably performed continuously (e.g., in real- or near-real time as data is collected), but can additionally or alternatively be performed upon detection of a trigger event (e.g., a rapid change in vehicle telemetry), asynchronously, periodically, or with any other suitable temporal characteristics. Block S200 is preferably implemented, at least in part, using a synthetic neural network (e.g., a convolutional neural network/CNN), but can additionally or alternatively be wholly or partially implemented using a Bayesian, deterministic, probabilistic, stochastic, and/or classification-based model, and/or any other suitable computational model. In a first variation, Block S200 includes matching a combination of sampled measurement values to a predetermined pattern, wherein the predetermined pattern is indicative of an adverse vehicle event. In a specific example of this variation, Block S200 includes performing a curve fitting procedure on a curve of acceleration versus time to identify a set of curve features (e.g., peaks, troughs, slopes, etc.) known to correspond to a head-on collision (e.g., a curve that includes a rapid direction change with a crumple-zone reversal, as shown in FIG. 2). In a second variation, Block S200 includes determining that a first sensor measurement (e.g., an accelerometer measurement) satisfies a condition (e.g., surpasses a threshold value), triggering an analysis of a second sensor measurement (e.g., video data collected proximal in time to the first sensor measurement) upon determining that the first sensor measurement satisfies the condition, and determining that an adverse vehicle event has occurred based on the second sensor measurement. In a third variation, Block S200 includes continuously classifying a combination of sampled measurement values (e.g., obtained via a shifting sampling time window of any suitable time range), and determining that an adverse vehicle event has occurred and characteristics of the adverse vehicle event based on the combination of sampled measurement values. In a fourth variation, Block 200 includes ingesting vehicle sensor data (e.g., airbag sensors, etc.) and/or monitoring for vehicle subsystem operation associated with adverse events (e.g., airbag deployment). In a fifth variation, Block 200 includes detecting the adverse vehicle event from the external-facing video, such as by detecting an object less than a threshold distance from the vehicle or camera, detecting a newly crumpled hood in the frame, or detecting other visual fiducials. However, Block S200 can include otherwise analyzing the vehicle event data in any other suitable manner.

Block S200 can optionally include determining a false positive, which functions to identify vehicle events that were initially determined to be an adverse vehicle event but have a substantial likelihood of being a nominal vehicle event. For example, Block S200 can include implementing a set of rules using the sensor data as an input and extracting a probability that the sensor data corresponded to a nominal vehicle event (e.g., closing a trunk lid) and not to an adverse vehicle event, and determining that the vehicle event is not an adverse vehicle event based on the probability exceeding a predetermined probability threshold.

Block S200 can optionally include determining characteristics of the adverse vehicle event based on the analysis of the collected sensor data. Determining characteristics of the adverse vehicle event can include segmenting of vehicle event types (e.g., between major collisions and minor collisions, high speed collisions and low speed collisions, etc.) into any suitable number of segments. Determining characteristics can also include determining a likelihood (e.g., probability) of injury to vehicle occupants and/or other entities involved in an adverse vehicle event. A likelihood of injury can be determined based on any suitable vehicle data, such as data indicative of airbag deployment (e.g., coupled with determined occupant bodyweight and/or height data), occupant medical history, a predictive model that associates vehicle event data with injury type and/or likelihood, and/or any other suitable data.

Block S200 can include determining a fault status associated with the driver. The fault status preferably defines the responsibility of one or more participants in an adverse vehicle event; for example, Block S200 can include determining that a driver that rear ends a leading vehicle without any extenuating circumstances (e.g., such as the leading vehicle driving unsafely) is "solely at fault." The fault status can include: sole responsibility, wherein a single party or participant bears total fault for the occurrence of an adverse event; partial responsibility (e.g., wherein the driver failed to take reasonable actions that may have reduced a severity of an adverse event but did not cause the adverse event, wherein two or more drivers independently took actions that together caused a collision or other adverse vehicle event, etc.); no-fault or no responsibility (e.g., wherein the driver could not reasonably have taken any action to avoid or reduce the severity of an adverse vehicle event); and any other suitable designation of fault or responsibility. The determination of the fault status is preferably based on driver behavior data (e.g., extracted or otherwise suitably determined in one or more variations of Block S100); however, data on which to base the determination of fault status can be any other suitable data (e.g., collected in accordance with one or more variations of Block S100).

A specific implementation of Block S200 includes detecting a trigger (e.g., a velocity change exceeding a predetermined threshold), uploading vehicle event data to a remote computing system, and analyzing the uploaded vehicle event data at the remote computing system. Detecting the trigger can include determining a time period roughly centered at the time point of trigger detection, and selecting the vehicle data determined in Block S100 within the determined time period. The time period can be an adjustable time period (e.g., based on queries submitted at a later time point from an insurance claim entity such as an agent, after reviewing received insurance claim data), a fixed time period, and/or any other suitable time period. In a first variation of this specific implementation, uploading the vehicle event data can be based on the detected trigger (e.g., uploading when the trigger is detected). In a second variation of this specific implementation, uploading the vehicle event data can be performed continuously (e.g., can include continuously streaming vehicle data to a remote computing system). However, uploading can be otherwise performed with any suitable temporal characteristics (e.g., asynchronously, periodically, etc.). In this specific implementation, analyzing the uploaded vehicle event data can include analyzing inertial data (e.g., gathered using an IMU of an installable onboard vehicle system) and video data (e.g., gathered using one or more cameras of an installable onboard vehicle system). Analyzing the uploaded vehicle event data can optionally include determining a false positive, and can further include storing the contextual data surrounding the false positive for subsequent retrieval and future false positive determination.

Block S200 can include determining a loss probability based on one or more event parameters (e.g., extracted or otherwise suitably determined in accordance with one or more variations of Block S100). In variations, Block S200 can include calculating a loss probability based on an ego-vehicle acceleration and an ego-vehicle attitudinal shift (e.g., extracted from sensor data, determined based on image data, determined in accordance with one or more variations of Block S100, etc.). In related variations, Block S200 can additionally or alternatively include calculating a loss probability based on acceleration and/or attitudinal shift of secondary vehicles that are participants in the adverse vehicle event (e.g., denoted by participant identifiers).

In variations, calculating the loss probability can be performed using an adverse vehicle event model that receives an acceleration (e.g., a peak acceleration, an average acceleration, etc.) and/or an attitudinal shift (e.g., a peak attitudinal shift, an average angular orientation change over a time interval, etc.) as inputs and produces a probability of property loss as an output (e.g., a loss probability) based on insurance claim data (e.g., historical data, gathered population data, etc.). The model can additionally or alternatively produce a probability-weighted cost estimate as an output (e.g., an expected value of a repair and/or replacement cost). The adverse vehicle event model can be a trained machine learning model, wherein the model is trained based on a corpus of event parameters (e.g., extracted from vehicle event data corresponding to vehicle events experienced by a population of ego-vehicles, as well as corresponding insurance claim data associated with the events experienced by the population of ego-vehicles). In one example, the adverse vehicle event model can be trained on claim outcomes pulled from an insurance provider (e.g., total cost, such as losses or expenses; time to closure; cost by category, such as personal injury or property damage; etc.), wherein the adverse vehicle event model can predict loss amounts based on collision type (e.g., class) and collision context (e.g., driving context). In a specific example, the adverse vehicle event model can identify historic claims with similar collision type and collision context, and determine a predicted loss for an instantaneous claim based on the similar historic claims. The loss type associated with the loss probability can be property loss (e.g., vehicle loss, vehicle damage, objects damaged by the vehicle over the course of the adverse event, etc.), personal injury loss (e.g., occupant death, occupant injury, etc.), and any other suitable loss. However, the adverse vehicle event model can additionally or alternatively include any other suitable model (e.g., a deterministic model, a set of equations, a probabilistic model, a lookup table, etc.) otherwise implemented in any other suitable manner.

The method includes Block S300, which recites: automatically generating insurance claim data based on the determined adverse vehicle event. Block S300 functions to organize information necessary for preparing and/or filing (e.g., submitting) an insurance claim to an insurance entity (e.g., an insurance underwriter, an insurance agency, an insurance agent, a third party claims administrator, any other suitable entities related to the main customer insurance entity, etc.). Block S300 can also function to provide rich data (e.g., audio, video, environmental, dynamic, static, and/or any other suitable data) associated with an adverse vehicle event to enable claim value (e.g., monetary value) to be accurately assessed by a user (e.g., an insurance claim agent). Block S300 can include compiling vehicle event data, compiling auxiliary data, and estimating claim costs (e.g., monetary costs). Block S300 is preferably performed by a remote computing system (e.g., the remote computing system by which Block S200 can be performed), but can additionally or alternatively be performed by the vehicle computing system (e.g., vehicle computer, processor of a mobile device associated with the vehicle and/or a vehicle occupant, etc.). Block S300 can include retrieving any suitable data (e.g., vehicle event data, intrinsic vehicle data, occupant data, etc.) from any suitable onboard vehicle system and/or computing system associated with the vehicle. In further alternatives, Block S300 can be performed in a distributed fashion (e.g., an insurance claim data template can be generated at a vehicle computing system and populated at a remote computing system, or vice versa), and/or otherwise performed at any suitable location(s).

In one variation, Block 300 includes: classifying the vehicle event (e.g., degree of severity, whether the event or event class requires a human claims adjustor or can be sent to an automated adjustor system, the fault status, the injury probability, etc.), automatically selecting one or more insurance claims (e.g., insurance forms) to fill out based on the vehicle event class, automatically selecting an endpoint for the insurance claim, and automatically transmitting the insurance claim to the endpoint. In a specific example, the method can include selecting, filling out, and sending a first insurance claim to an automatic claims system in response to vehicle event classification as a first class associated with automatic claims adjustment (e.g., a rear-end collision with known insurers), and include selecting, filling out, and sending a second insurance claim to a human claims system in response to vehicle event classification as a second class associated with human claims adjustment (e.g., a hit-and-run collision). However, the claims can be otherwise determined and routed.

Compiling vehicle event data functions to organize the determined characteristics of the adverse vehicle event determined in Block S200. Compiling the vehicle event data can include retrieving video data of the vehicle exterior, vehicle interior, and/or any other suitable location collected by the onboard vehicle system proximal in time to a time point of the determined adverse vehicle event. Compiling the vehicle event data can also include retrieving some or all the telemetry data collected proximal in time to the time point of the determined adverse vehicle event (e.g., OBD II port data), retrieving the insurance number (e.g., policy number, insured name, etc.). However, compiling vehicle event data can include receiving, retrieving, and/or otherwise suitably determining the vehicle event data in any suitable manner.

Compiling auxiliary data functions to organize other data related to the vehicle and/or other entity associated with the determined adverse vehicle event. Auxiliary data can include vehicle data (e.g., as described above in relation to Blocks S100 and S200), occupant data (e.g., as described above in relation to Blocks S100 and S200), and any other suitable data (e.g., location data, timestamp, historical data, etc.) associated with one or more characteristics of the adverse vehicle event (e.g., such as a medical history of an occupant, to be combined with an estimated crash severity to determine the likelihood of a legitimate medical injury claim; a maintenance history of the vehicle, to be combined with a determined component failure that caused an adverse vehicle event; visual data characterizing injury of the driver and/or other occupant, to be combined with determined severity of the vehicle event and/or a responsive action to contact emergency services; any other suitable characteristics; etc.).

Estimating claim costs functions to determine, based on the adverse vehicle event determined in Block S200, the expected cost related to the adverse vehicle event. The expected cost can include monetary costs, such as those associated with repair, medical treatment, and any other suitable costs associated with adverse vehicle events. The expected cost can include time cost, such as an expected repair time (e.g., a time period wherein the vehicle will be inoperable), treatment time (e.g., an expected healing time for an injury type determined to be likely in Block S200), and any other suitable time costs associated with adverse vehicle events. The expected costs can be estimated based on models (e.g., one or more machine learning models) that accept vehicle event data and auxiliary data as inputs, a lookup table, a deterministic set of rules, and/or on any other suitable basis. In variations, the estimation models can be trained on historic insurance claim data, claim adjuster labelled vehicle event data, and/or any other suitable training data. In a specific example, Block S300 can include estimating a claim cost based on the loss probability and the fault status (e.g., determined in accordance with one or more variations of Block S200). In variations, Block S300 can include estimating a claim cost based at least one of the loss probability, the fault status, the presence of injury (e.g., of one or more occupants of the vehicle, the driver, etc.), probability of litigation, probability of claim challenge (e.g, in a court, by an insurer, by any other related entity, etc.), and any other suitable basis. However, Block S300 can additionally or alternatively include otherwise suitably estimating the monetary cost of an insurance claim, an FNOL, and/or associated insurance claim data.

Block S300 can be performed in response to a loss probability (e.g., determined in accordance with one or more variations of Block S200) exceeding a threshold probability. In variations, Block S300 can include transforming the set of event parameters and the fault status for each of the plurality of participant identifiers into insurance claim data in response to the loss probability exceeding a threshold probability. In a specific example, transforming the event parameters and the fault statuses into the insurance claim data can include: determining that the event parameters correspond to an adverse vehicle event that includes a totaling of the vehicle (e.g., based on an estimated claim cost, determined based on the loss probability) and a "no-fault" fault status of the vehicle driver, and generating an insurance claim that indicates a totaling of the insured vehicle and that the driver was not at fault.

In examples, Block S300 and/or other portions of the method (e.g., Block S100, Block S200, etc.) can employ machine learning approaches including any one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an a priori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable form of machine learning algorithm.

In examples, the method 100 includes training a claims adjustment module based on vehicle event data extracted from interior image data and exterior image data (e.g., sampled by one or more onboard vehicle systems) corresponding to a population of ego-vehicles (e.g., a corpus of event parameters). In such examples, transforming the set of event parameters (e.g., and the fault status for each of the plurality of participant identifiers) into insurance claim data is preferably performed using the claim adjustment module (e.g., trained using any suitable method of those described above and/or any other suitable method); however, transforming the set of event parameters into insurance claim data can be otherwise suitably performed.

The method includes Block S400, which recites: transmitting insurance claim data to an endpoint. Block S400 functions to make claim data accessible to external entities (e.g., that require data to initiate and/or track an insurance claim). Block S400 can also function to automatically maintain a record (e.g., a remotely stored record) of vehicle events (e.g., nominal vehicle events, adverse vehicle events). The endpoint is preferably a web service endpoint (e.g., defined by a WSDL document), but can additionally or alternatively be any suitable remote repository of information that is accessible by insurance-related entities (e.g., a PDF or HTML form that can be submitted to an entity or other endpoint, a database of insurance claim data, etc.). Block S400 is preferably performed by a communication module associated with the vehicle; the communication module can be integrated with the vehicle (e.g., a wireless internet modem of the vehicle), part of a mobile device associated with the vehicle and/or an occupant of the vehicle (e.g., a cellular radio), part of a mobile device paired with a dashboard camera module emplaced in the vehicle, and/or any other suitable communication module. In alternatives, Block S400 can be performed in a distributed manner; for example, data can be transmitted to a central repository (e.g., an endpoint server, a remote server, a remote computing system, etc.) where it is linked together according to any suitable protocols and/or processes and made available for on-demand retrieval by an entity.

Figure 4:
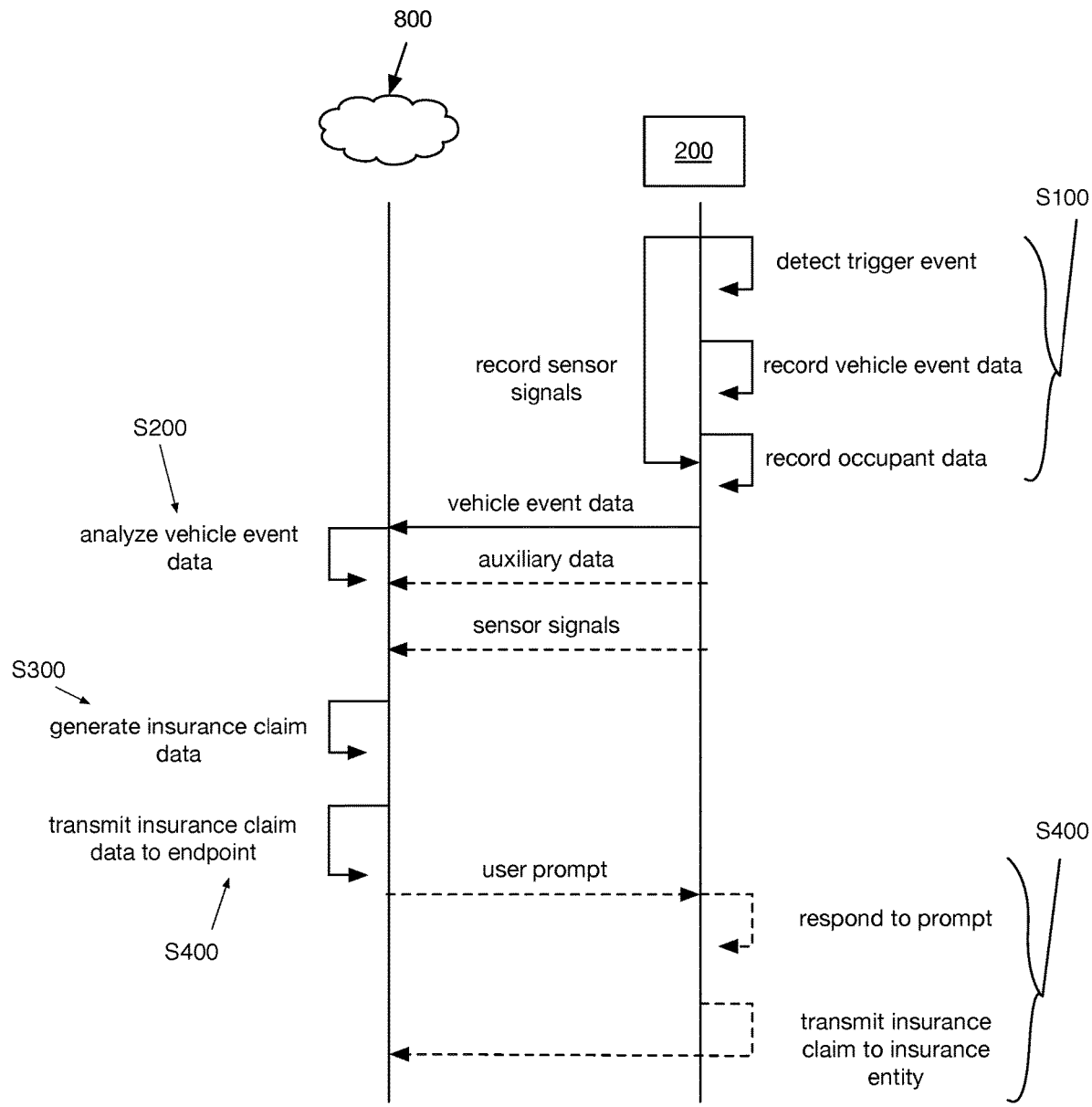
FIG. 4 is a flowchart representation of a specific example implementation of the method.

Block S400 can, in variations, include determining a destination entity (e.g., an insurance company, department within the insurance company, specific insurance adjuster, etc.) to which to transmit the insurance claim data (e.g., based on insurance company associated with the vehicle, associated with a user device, associated with the installable onboard vehicle system, etc.), wherein the endpoint is associated with the destination entity. The destination entity can be selected based on the event parameter or characteristic value (e.g., based on the event severity, event class, driver fault, etc.), based on the estimated claim value or probability of resolution in favor of one or more parties (e.g., claims with a high probability of being challenged sent to a first entity, claims with a high probability of settlement sent to a second entity, low payout claims sent to a third entity, high probability of resultant litigation sent to a fourth entity, one or more of the aforementioned associated probabilities sent to the same entity, etc.), or otherwise selected. A high probability can be determined based on a threshold probability (e.g., 51%, 80%, 95%, etc.), an expected value (e.g., obtained via integrating a probability distribution of various claim outcomes or resolutions), and/or otherwise suitably determined. The destination entity can be selected using a lookup table (e.g., specified by the entity), a trained neural network (e.g., trained based on entity success rates for a given claim parameter, etc.), heuristics, deterministics, or otherwise determined. As shown in FIG. 4, Block S400 can also optionally include prompting the driver of the vehicle (e.g., at a mobile application rendered at a display of a mobile device of the driver) to approve submission of the insurance claim data, and transmitting the insurance claim data upon receipt of driver approval.

In a specific example, Block S400 includes prompting a user corresponding to one participant identifier (e.g., extracted in accordance with one or more variations of Block S100) to provide a transmission instruction at a mobile device associated with the user. In this example and in response to receiving the transmission instruction, Block S400 includes automatically transmitting the insurance claim data to an endpoint at a remote computing system. The endpoint can of various types, such as a web service endpoint, a database endpoint, a user-defined endpoint, and any other suitable type.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller 430. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and/or method blocks.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for determining an adverse vehicle event, comprising:
    sampling sensor data over a time interval using an onboard vehicle system rigidly coupled to an ego-vehicle;
    at a processor of the onboard vehicle system, determining a set of event parameters, wherein at least one of the event parameters is based on the sensor data, wherein the event parameters are associated with a vehicle event occurring within the time interval, wherein the set of event parameters comprises:
        a first event parameter comprising a participant identifier,
        a second event parameter comprising an acceleration of the ego-vehicle during the time interval, and
        a third event parameter comprising an attitudinal shift of the ego-vehicle during the time interval;
    computing a loss probability based on the attitudinal shift or based on both the acceleration and the attitudinal shift, wherein the loss probability indicates a probability of property loss and/or personal injury;
    in response to the loss probability exceeding a threshold probability, determining insurance claim data based on one or more of the event parameters; and
    transmitting the insurance claim data to a recipient;
    wherein the sensor data comprise image data, and wherein the act of determining the third event parameter comprising the attitudinal shift of the ego-vehicle comprises:
        determining a first position of an object depicted in a first frame of the image data at a first time point within the time interval;
        determining a second position of the object or another object depicted in a second frame of the image data at a second time point within the time interval subsequent to the first time point; and
        calculating the attitudinal shift of the ego-vehicle based on the first position and the second position.

2. The method of claim 1, wherein the act of sampling the image data is performed at a monocular camera of the onboard vehicle system.

3. The method of claim 1, wherein the act of sampling the image data is performed in response to detecting a trigger.

4. The method of claim 3, further comprising sampling an accelerometer signal from an accelerometer of the onboard vehicle system at a time point prior to the time interval, wherein the trigger comprises the accelerometer signal exceeding a threshold value.

5. The method of claim 1, further comprising:
    determining driver behavior data corresponding to a driver of the ego-vehicle based on the image data; and
    determining a fault status associated with the driver based on the driver behavior data;
    wherein the insurance claim data is determined based also on the fault status.

6. The method of claim 5, wherein the act of determining the insurance claim data comprises estimating a claim cost based on the loss probability and the fault status.

7. The method of claim 1, further comprising determining a number of occupants in the ego-vehicle during the time interval.

8. The method of claim 1, further comprising training a claim adjustment module based on other sets of event parameters determined from sensor data sampled by one or more other onboard vehicle systems of one or more other ego-vehicles, and wherein the insurance claim data is determined using the claim adjustment module.

9. The method of claim 1, further comprising prompting a person involved in the vehicle event to provide a transmission instruction at a mobile device associated with the person, and wherein the insurance claim data is transmitted in response to receiving the transmission instruction.

10. The method of claim 1, wherein the act of determining the second event parameter comprising the acceleration comprises:
   determining a first velocity of an object represented in the image data;
   determining a second velocity of the object or another object represented in the image data; and
   calculating the acceleration of the ego-vehicle based on the first velocity and the second velocity.

11. The method of claim 10, wherein the loss probability is determined using an adverse vehicle event model, wherein the adverse vehicle event model is trained based on other event parameters associated with other ego-vehicles and corresponding insurance claim data.

12. The method of claim 1, wherein the acceleration comprises a single peak acceleration value, and wherein the attitudinal shift comprises a single peak attitudinal shift value.

13. A method for determining an adverse vehicle event, comprising:
   obtaining event parameters associated with a vehicle event occurring within a time interval, wherein the event parameters are sensor data or are based on the sensor data provided by an onboard vehicle system, wherein the event parameters comprise:
      an acceleration of a vehicle, and
      an attitudinal shift of the vehicle;
   determining insurance claim data based on one or more of the event parameters;
   determining, by a processing unit, a loss probability indicating a probability of property loss and/or personal injury, wherein the processing unit determining the loss probability is configured to obtain (1) the attitudinal shift or (2) both of the acceleration and the attitudinal shift as input; and
   in response to the loss probability exceeding a threshold probability, transmitting the insurance claim data to a recipient;
   wherein the attitudinal shift of the vehicle is based on:
      a first position of an object depicted in a first frame of image data at a first time point within the time interval; and
      a second position of the object or another object depicted in a second frame of the image data at a second time point within the time interval subsequent to the first time point.

14. The method of claim 13, wherein the act of obtaining the event parameters, the act of determining the loss probability, the act of determining the insurance claim data, and the act of transmitting the insurance claim data, are performed by a system that is in communication with the onboard vehicle system.

15. The method of claim 13, further comprising obtaining a participant identifier indicating an identity of a participant involved in the vehicle event.

16. The method of claim 15, further comprising determining the recipient to which the insurance claim data are to be transmitted, wherein the recipient is determined based on the participant identifier.

17. The method of claim 13, wherein the acceleration of the vehicle is based on the image data, or is provided by an accelerometer.

18. The method of claim 13, further comprising:
   obtaining driver behavior data corresponding to a driver of the vehicle, wherein the driver behavior data are based the sensor data provided by the onboard vehicle system; and
   determining a fault status associated with the driver based on the driver behavior data;
   wherein the insurance claim data is determined based also on the fault status.

19. The method of claim 13, wherein the loss probability is determined using an adverse vehicle event model, wherein the adverse vehicle event model is a neural network model.

* * * * *